United States Patent
Tanoue et al.

(10) Patent No.: US 10,466,055 B2
(45) Date of Patent: Nov. 5, 2019

(54) INFORMATION PROCESSING DEVICE, PORTABLE TERMINAL, METHOD FOR CONTROLLING INFORMATION PROCESSING DEVICE, AND PROGRAM RECORDING MEDIUM

(71) Applicant: Sharp Kabushiki Kaisha, Sakai, Osaka (JP)

(72) Inventors: Fumitoshi Tanoue, Sakai (JP); Shuji Daioku, Sakai (JP); Kengo Tajima, Sakai (JP); Yu Yumura, Sakai (JP); Kenichiro Ishikura, Sakai (JP); Akiko Andoh, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 226 days.

(21) Appl. No.: 15/528,207

(22) PCT Filed: Dec. 11, 2015

(86) PCT No.: PCT/JP2015/084767
§ 371 (c)(1),
(2) Date: May 19, 2017

(87) PCT Pub. No.: WO2016/104181
PCT Pub. Date: Jun. 30, 2016

(65) Prior Publication Data
US 2017/0328717 A1 Nov. 16, 2017

(30) Foreign Application Priority Data
Dec. 26, 2014 (JP) .................. 2014-266345

(51) Int. Cl.
*G01C 21/20* (2006.01)
*G01C 21/36* (2006.01)
(Continued)

(52) U.S. Cl.
CPC ......... *G01C 21/20* (2013.01); *G01C 21/3423* (2013.01); *G01C 21/36* (2013.01);
(Continued)

(58) Field of Classification Search
CPC .... G01C 21/20; G01C 21/36; G01C 21/3423; G01C 21/3484; G01C 21/3617; G06F 16/00
(Continued)

(56) References Cited

FOREIGN PATENT DOCUMENTS

| JP | 2011169800 A | * | 9/2011 |
| WO | 2011/036754 A1 | | 3/2011 |

OTHER PUBLICATIONS

English Translation: Hattori, WO 2011036754 A1, Mar. 31, 2011, WIPO Patent Publication, PatentScope English Translation (Year: 2011).*

(Continued)

*Primary Examiner* — Nadeem Odeh
(74) *Attorney, Agent, or Firm* — Keating & Bennett, LLP (57) ABSTRACT

An information processing device acquires information which corresponds to a location where a user exited a transportation means, and presents the information to the user. The information processing device includes (i) a boarding-and-exit determining section (42) configured to determine whether the user has exited a transportation means and (ii) a spot information presenting section (47) configured to present information which corresponds to a location where the user exited the transportation means, in a case where the boarding-and-exit determining section (42) determines that the user has exited the transportation means.

10 Claims, 5 Drawing Sheets (51) Int. Cl.
  *G01C 21/34*   (2006.01)
  *G06F 16/00*   (2019.01)
(52) U.S. Cl.
  CPC ......... *G06F 16/00* (2019.01); *G01C 21/3484* (2013.01); *G01C 21/3617* (2013.01)
(58) Field of Classification Search
  USPC ........................................................ 701/408
  See application file for complete search history.

(56) References Cited

OTHER PUBLICATIONS

English Translation: Hattori, WO 2011036754 A1, Mar. 31, 2011, WIPO Patent Publication, Alternative English Translation provided by Google (Year: 2011).*
English Translation: Tsubouchi, JP 2011169800 A, Sep. 2011, Japanese Patent Office Publication (Year: 2011).*
Official Communication issued in International Patent Application No. PCT/JP2015/084767, dated Jan. 12, 2016.

\* cited by examiner

Spot information  63

| Category | Class | Name | Latitude | Longitude |
|---|---|---|---|---|
| Commute | Station | Hibiya | 45.67 | 123.45 |
| Commute | Station | Shibuya | 44.78 | 122.78 |
| ⋮ | ⋮ | ⋮ | ⋮ | ⋮ |
| Stopover | Restaurant | Bar OO | ⋮ | ⋮ |
| Stopover | Bookstore | AA library XX branch | ⋮ | ⋮ |
| ⋮ | ⋮ | ⋮ | ⋮ | ⋮ |
| Sightseeing or business trip | Tourist spot | BB tower | ⋮ | ⋮ |
| Sightseeing or business trip | Convenience store | CC convenience store | ⋮ | ⋮ |
| ⋮ | ⋮ | ⋮ | ⋮ | ⋮ |

FIG. 3

Boarding-and-exit location history information  64

| Action | Time and date | Class | Name | Latitude | Longitude |
|---|---|---|---|---|---|
| Boarding | 2014/12/1 8:10 | Station | Hibiya | 45.67 | 123.45 |
| Exit | 2014/12/1 8:30 | Station | Shibuya | 44.78 | 122.78 |
| Boarding | 2014/12/1 8:35 | Stop | Shibuya | 44.88 | 122.68 |
| Exit | 2014/12/1 8:50 | Stop | Roppongi | 35.66 | 139.73 |
| ⋮ | ⋮ | ⋮ | ⋮ | ⋮ | ⋮ |

INFORMATION PROCESSING DEVICE, PORTABLE TERMINAL, METHOD FOR CONTROLLING INFORMATION PROCESSING DEVICE, AND PROGRAM RECORDING MEDIUM

TECHNICAL FIELD

The present invention relates to an information processing device, a portable terminal, a method of controlling the information processing device, and a program for controlling the information processing device. The present invention relates to, for example, an information processing device that presents information which corresponds to a current location of a user.

BACKGROUND ART

There has been conventionally known a transportation information presenting device which presents, without requiring a user to make any information input operation, information related to a transportation facility necessary for the user.

For example, Patent Literature 1 discloses a transportation information presenting device including (i) a transportation condition estimating section which estimates a transportation condition of a user, (ii) a boarding-and-exit determining section which determines whether the user has boarded or exited a transportation facility, (iii) a history holding section which holds boarding route history data in which a boarding station and an exit station are described so as to be associated with each other and so as to be related to a corresponding route which the user has ever used, (iv) a route candidate selecting section which selects a route of a transportation facility which the user will use next, with reference to boarding route information, with the use of the boarding route history data, and so on.

CITATION LIST

Patent Literature

[Patent Literature 1]
International Publication No. WO 2011/036754 (Publication Date: Mar. 31, 2011)

SUMMARY OF INVENTION

Technical Problem

The above conventional technique, however, has a configuration in which (i) an exit station where a user has exited a transportation facility is estimated with reference to a history of route(s) which the user has ever used and (ii) information, related to a transportation facility which corresponds to the exit station thus estimated, is presented. Such a conventional configuration causes a problem that, in a case where, for example, the user exits a transportation facility at a station other than an estimated exit station, the user cannot obtain, from the transportation information presenting device, information which corresponds to the station where the user has exited the transportation facility.

The present invention has been attained to address the above problem, and an objective of the present invention is to provide an information processing device which allows a user to obtain information which corresponds to a location where the user has exited a transportation means.

Solution to Problem

In order to attain the above object, an information processing device in accordance with an aspect of the present invention includes: a transportation means estimating section configured to estimate a transportation means which a user uses during transportation; a change determining section configured to determine whether the user has changed the transportation means; an exit determining section configured to determine that the user has exited the transportation means, in a case where the change determining section determines that the user has changed the transportation means; a location information acquiring section configured to acquire current location information indicative of a current location of the user; a spot information acquiring section configured to acquire spot information which corresponds to current location information which was acquired when the exit determining section determined that the user had exited the transportation means; and a spot information presenting section configured to present the spot information to the user.

A method of controlling an information processing device in accordance with an aspect of the present invention includes the steps of: (a) estimating a transportation means which a user uses during transportation; (b) determining whether the user has changed the transportation means; (c) determining that the user has exited the transportation means, in a case where it is determined in the step (b) that the user has changed transportation means; (d) acquiring current location information indicative of a current location of the user; (e) acquiring spot information which corresponds to current location information which was acquired in the step (d) when it was determined in the step (c) that the user had exited the transportation means; and (f) presenting the spot information to the user.

Advantageous Effects of Invention

An aspect of the present invention brings about an effect that a user can easily obtain spot information which corresponds to a location where the user has exited a transportation means.

DESCRIPTION OF EMBODIMENTS

Figure 1:
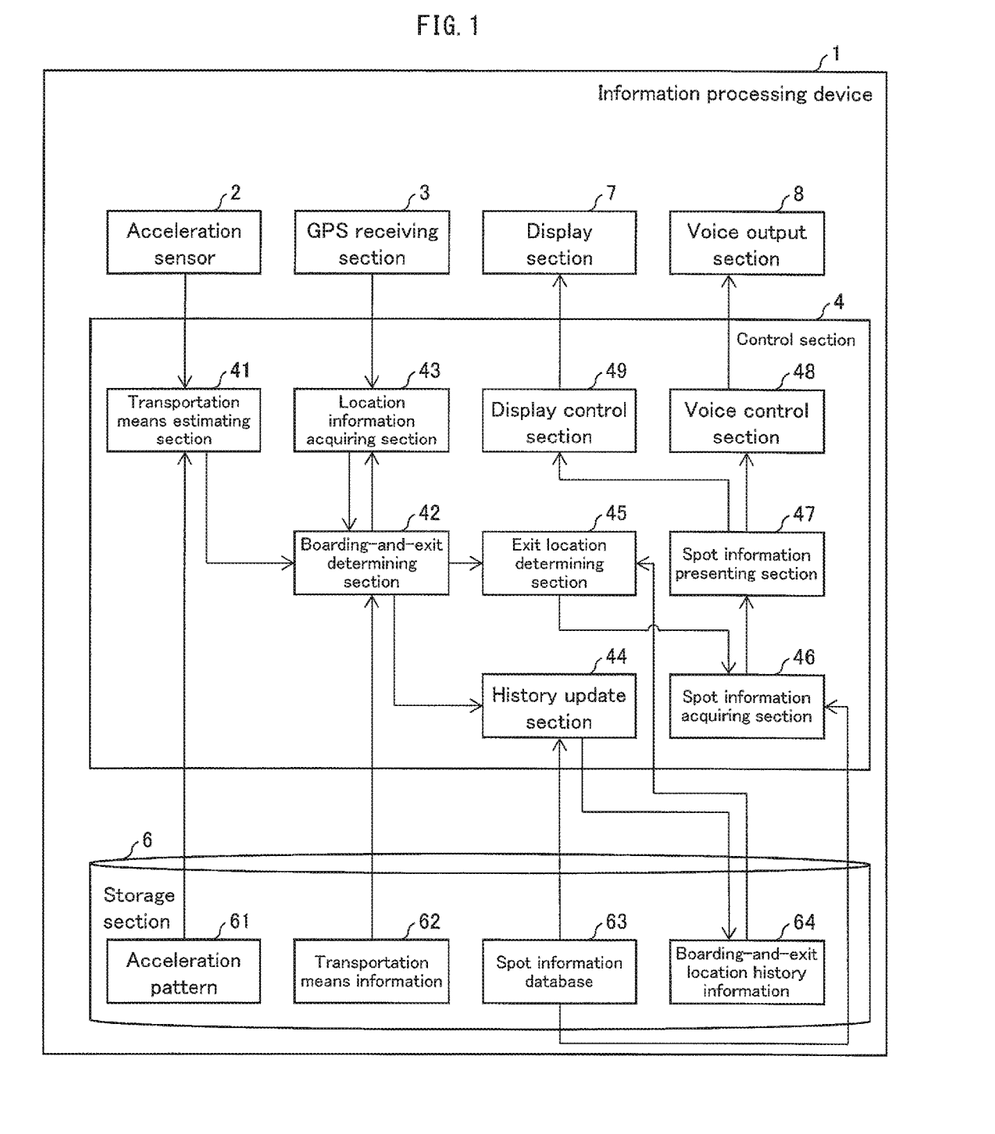
FIG. 1 is a block diagram illustrating a configuration of a main part of an information processing device in accordance with Embodiment 1.

[Embodiment 1]
The following description will discuss, with reference to FIG. 1, a configuration of a main part of an information processing device 1 in accordance with Embodiment 1. FIG. 1 is a block diagram illustrating the configuration of the main part of the information processing device 1. As illustrated in FIG. 1, the information processing device 1 includes an acceleration sensor 2, a GPS receiving section 3, a control section 4, a storage section 6, a display section 7, and a voice output section 8. The control section 4 includes a transportation means estimating section 41, a boarding-and-exit determining section (change determining section, exit determining section) 42, a location information acquiring section 43, a history update section 44, an exit location determining section 45, a spot information acquiring section 46, a spot information presenting section 47, a voice control section 48, and a display control section 49.

The information processing device 1 can be configured to be included in a portable terminal, such as a portable telephone, a laptop computer, a tablet terminal, an e-book reader, and a PDA.

The acceleration sensor 2 detects accelerations, in given axial directions (e.g., in three axial directions (X, Y, Z axes)), on the information processing device 1. The acceleration sensor 2 transmits the accelerations thus detected to the transportation means estimating section 41.

The GPS receiving section 3 is configured to receive radio waves (GPS signal) from the global positioning system (GPS) in accordance with an instruction from the location information acquiring section 43, and then transmits the GPS signal thus received to the location information acquiring section 43. Note that the present specification discusses an example configuration in which the GPS is used to acquire location information of a user, but is not limited as such. Alternatively, for example, information (cell ID) from a portable telephone base station or a beacon such as BLE or Wi-Fi (registered trademark) can be employed.

The transportation means estimating section 41 is configured to estimate a transportation means that the user uses during transportation. Specifically, the transportation means estimating section 41 refers to an acceleration pattern stored in the storage section 6, and estimates a transportation means which the user uses, with reference to an acceleration pattern, detected for a given period of time, which is received from the acceleration sensor 2. The acceleration pattern 61 indicates various acceleration patterns of respective transportation means. Examples of the transportation means, estimated by the transportation means estimating section 41, encompass walking, a train, an automobile, a bicycle, and an elevator. The transportation means estimating section 41 transmits, to the boarding-and-exit determining section 42, information indicative of the transportation means thus estimated. Note that the present specification discusses an example configuration in which the transportation means, which the user uses during the transportation, is estimated with reference to the accelerations but is not limited as such. Alternatively, the transportation means can be estimated by using, for example, a gyroscopic sensor, a geomagnetism sensor, or an air pressure sensor.

The boarding-and-exit determining section 42 determines whether the user has changed the transportation means. Specifically, the boarding-and-exit determining section 42 records, in transportation means information 62 stored in the storage section 6, a received transportation means which the user has been using. In so doing, the boarding-and-exit determining section 42 compares (i) the received transportation means with (ii) transportation means which the boarding-and-exit determining section 42 recorded immediately before the received transportation means is recorded. In a case where the above (i) and (ii) differ from each other, the boarding-and-exit determining section 42 determines that the user has changed the transportation means.

In a case where the boarding-and-exit determining section 42 determines that the user has changed the transportation means, it identifies an action of the user based on (i) the transportation means used by the user immediately before the change and (ii) the transportation means used by the user immediately after the change. In a case where the user has changed the transportation means from "train" to "walking", the boarding-and-exit determining section 42 identifies the action of the user as "exit". Conversely, in a case where the user changed the transportation means from "walking" to "train", the boarding-and-exit determining section 42 identifies the action of the user as "boarding". In a case where the boarding-and-exit determining section 42 determines that the user has changed the transportation means, it also acquires, via the location information acquiring section 43, current location information indicative of a current location of the user (e.g., a longitude and a latitude that indicate a current location of the user). Subsequently, the boarding-and-exit determining section 42 transmits, to the history update section 44, (i) the current location information thus acquired and (ii) the action of the user.

Note that in a case where the boarding-and-exit determining section 42 determines that the action of the user is "exit", it transmits the current location information, acquired as discussed above, to the exit location determining section 45. That is, the boarding-and-exit determining section 42 transmits, to the exit location determining section 45, the current location information acquired at a time point when the above determination was made.

In accordance with an instruction from the boarding-and-exit determining section 42, the location information acquiring section 43 receives a GPS signal from the GPS receiving section 3, and acquires, from the GPS signal thus received, the current location information indicative of the current location of the user.

The history update section 44 updates boarding-and-exit location history information (history data) 64 stored in the storage section 6. Specifically, the history update section 44 acquires, from a spot information database 63 stored in the storage section 6, a name of a spot (i.e., spot name such as name of station, name of stop, etc.) which corresponds to the current location information. Subsequently, the history update section 44 writes, into the boarding-and-exit location history information 64, (i) a latitude of and a longitude of the current location information, (ii) the name of the spot thus acquired, (iii) the current time, and (iv) the action of the user. Note that the boarding-and-exit location history information 64 and the spot information database 63 will be later discussed in detail.

Figure 2:
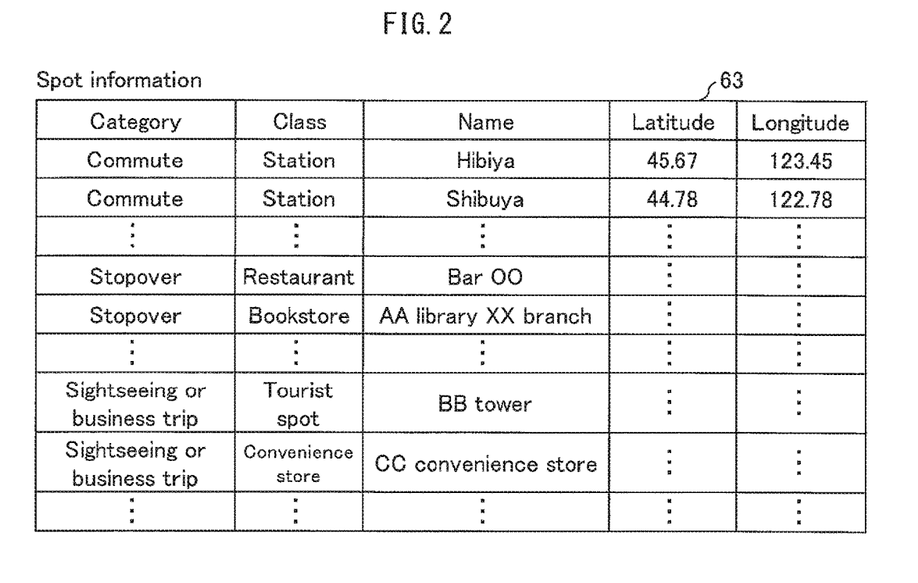
FIG. 2 is a view illustrating a spot information database in accordance with Embodiments 1 and 2.

The spot information database 63 will be discussed below with reference to FIG. 2. In the spot information database 63, (i) a "name" of a spot and (ii) a location (longitude and latitude) of the spot are associated with each other as spot information (see FIG. 2). Each piece of the spot information is classified into a category indicative of an action of the user such as "commute", "stopover", and "sightseeing or business trip". Furthermore, each piece of the spot information is associated with a class of a spot such as "station", "restaurant", "bookstore", "convenience store", "cafe" (not illustrated), and "tourist spot". For example, spot information which belongs to a category of "commute" indicates a spot which falls under a class of, for example, "station". Spot information which belongs to a category of "stopover"

indicates a spot which falls under a class of, for example, "restaurant" or "bookstore". Spot information which belongs to a category of "sightseeing or business trip" indicates a spot which falls under a class of, for example, "convenience store", "tourist spot", or "cafe". That is, categories of and classes of spots are associated with each other in the spot information database 63 so as to support various actions of the user.

Figure 3:
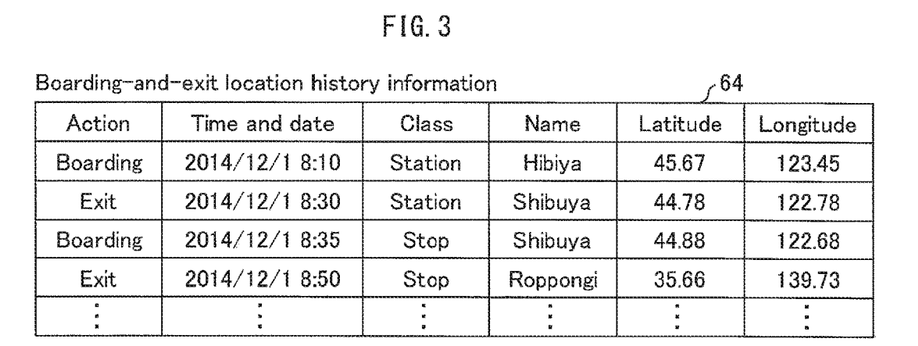
FIG. 3 is a view illustrating boarding-and-exit location history information in accordance with Embodiments 1 and 2.

The boarding-and-exit location history information 64 will be discussed below with reference to FIG. 3. As illustrated in FIG. 3, the boarding-and-exit location history information 64 stores a plurality of pieces of previous location information each of which indicates a location where the user has ever changed (e.g., boarded or exited) the transportation means. Specifically, the boarding-and-exit location history information 64 stores (i) an action of the user, (ii) time and date, (iii) a class of a spot, (iv) a name of the spot, and (v) a location (longitude and latitude) of boarding or exit, which are associated with each other as a history of location where the user has ever boarded or exited the transportation means.

The exit location determining section 45 compares (i) the current location indicated by the current location information received from the boarding-and-exit determining section 42 with (ii) locations stored in the boarding-and-exit location history information 64.

Specifically, the exit location determining section 45 determines whether the current location information matches previous location information which appeared relatively frequently in the boarding-and-exit location history information 64. For example, the exit location determining section 45 adds a score to each spot, stored in the boarding-and-exit location history information 64, in accordance with a frequency of appearance of the each spot. The exit location determining section 45 determines whether any one of two pieces of previous location information of two spots, which have respective relatively high scores out of all spots stored in the boarding-and-exit location history information 64, matches the current location information received from the boarding-and-exit determining section 42.

In a case where the exit location determining section 45 determines that the current location information matches one of the two pieces of previous location information which appeared relatively frequently in the boarding-and-exit location history information 64, it instructs the spot information acquiring section 46 to acquire spot information which corresponds to the current location information matching the previous location information.

According to Embodiment 1, a location, which is indicated by the previous location information that appeared relatively frequently in the boarding-and-exit location history information 64, is a station (usual boarding station or usual exit station) which the user uses to, for example, commute. In a case where the exit location determining section 45 determines that the current location information matches the previous location information which appeared relatively frequently in the boarding-and-exit location history information 64, the exit location determining section 45 (i) transmits the current location information to the spot information acquiring section 46 and (ii) instructs the spot information acquiring section 46 to acquire spot information which belongs to the category of "commute". Note that the determination made by the exit location determining section 45 is based on the configuration in which the exit location determining section 45 determines, with the use of the location information (longitude and latitude), whether a current location indicated by current location information matches any one of two locations which appeared relatively frequently in the boarding-and-exit location history information 64, but Embodiment 1 is not limited as such. Embodiment 1 can employ, for example, an alternative configuration in which the exit location determining section 45 determines, with the use of a name of a spot (name of station), whether the current location indicated by current location information matches any one of two stations which appeared relatively frequently in the boarding-and-exit location history information 64. In such a case, the exit location determining section 45 can be configured to receive a name of a spot acquired by the history update section 44.

The exit location determining section 45 can further determine whether the current location information matches location information indicative of an intermediate location between two locations indicated by respective two pieces of previous location information, which appeared relatively frequently in the boarding-and-exit location history information 64. According to Embodiment 1, the intermediate location can be, for example, a station located between a station where the user boards and a station where the user exits a train while commuting. In some cases, the user is assumed to make a stopover while commuting. Accordingly, in a case where the exit location determining section 45 determines that the current location information matches the intermediate location, the exit location determining section 45 (i) transmits the current location information to the spot information acquiring section 46 and (ii) instructs the spot information acquiring section 46 to acquire spot information which belongs to the category of "stopover".

The exit location determining section 45 determines (i) whether current location information matches none of the two pieces of previous location information and (ii) whether the current location information matches location information indicative of an intermediate location between two locations indicated by the respective two pieces of previous location information. In a case where the current location information matches none of the two pieces of previous location information and the location information indicative of the intermediate location, the exit location determining section 45 instructs the spot information acquiring section 46 to acquire spot information which corresponds to the current location information matching none of the two pieces of previous location information and the location information indicative of the intermediate location. According to Embodiment 1, a location that matches none of the two pieces of previous location information and the location information indicative of the intermediate location can be a station which the user uses to go on a sightseeing or a business trip. Accordingly, the exit location determining section 45 (i) transmits the current location information to the spot information acquiring section 46 and (ii) instructs the spot information acquiring section 46 to acquire spot information which belongs to the category of "sightseeing or business trip".

The spot information acquiring section 46 acquires spot information which corresponds to a relationship between (i) respective ones of a plurality of pieces of previous location information indicative of respective locations where the user has ever boarded or exited the transportation means and (ii) current location information. Specifically, the spot information acquiring section 46 receives, from the exit location determining section 45, (i) current location information and (ii) a category of spot information to be acquired, and acquires the spot information from the spot information database 63. For example, the spot information acquiring section 46 acquires spot information of a spot which is located within a given range whose base point is the current location information received from the exit location determining section 45. Note that the given range can differ depending on the category received from the exit location determining section 45. For example, in a case where the category is "sightseeing or business trip", the given range can be set to be larger as compared with a case where the category is "commute". The spot information acquiring section 46 transmits the spot information thus acquired to the spot information presenting section 47.

The spot information presenting section 47 outputs the spot information to the display section 7 or the voice output section 8 via the display control section 49 or the voice control section 48, respectively.

The storage section 6 stores therein information, and is composed of (i) a nonvolatile storage device such as a flash memory or a read only memory (ROM) and (ii) a volatile storage device such as a random access memory (RAM). Examples of contents to be stored in the nonvolatile storage device include various programs, various action setting values, and various data. Examples of contents to be stored in the volatile storage device include work files and temporary files. According to Embodiment 1, the storage section 6 stores the acceleration pattern 61, the transportation means information 62, the spot information database 63, and the boarding-and-exit location history information 64.

The display section 7 includes a display device such as a liquid crystal display or an organic electroluminescence (EL) display.

The voice output section 8 includes voice output devices such as a speaker and earphones.

The information processing device 1 can further include an input section, composed of a touch panel and the like, via which the user can operate the information processing device 1. The input section can include, for example, a power button, a volume button, and a grip sensor (electrostatic sensor that detects a user's hand holding the information processing device 1). The information processing device 1 can further include a communication section or the like including an antenna via which a communication is made with an external device. Note that in a case of making a communication with an external device, the 3rd generation (3G) line, Wi-Fi (registered trademark), or Bluetooth (registered trademark) can be used.

Figure 4:
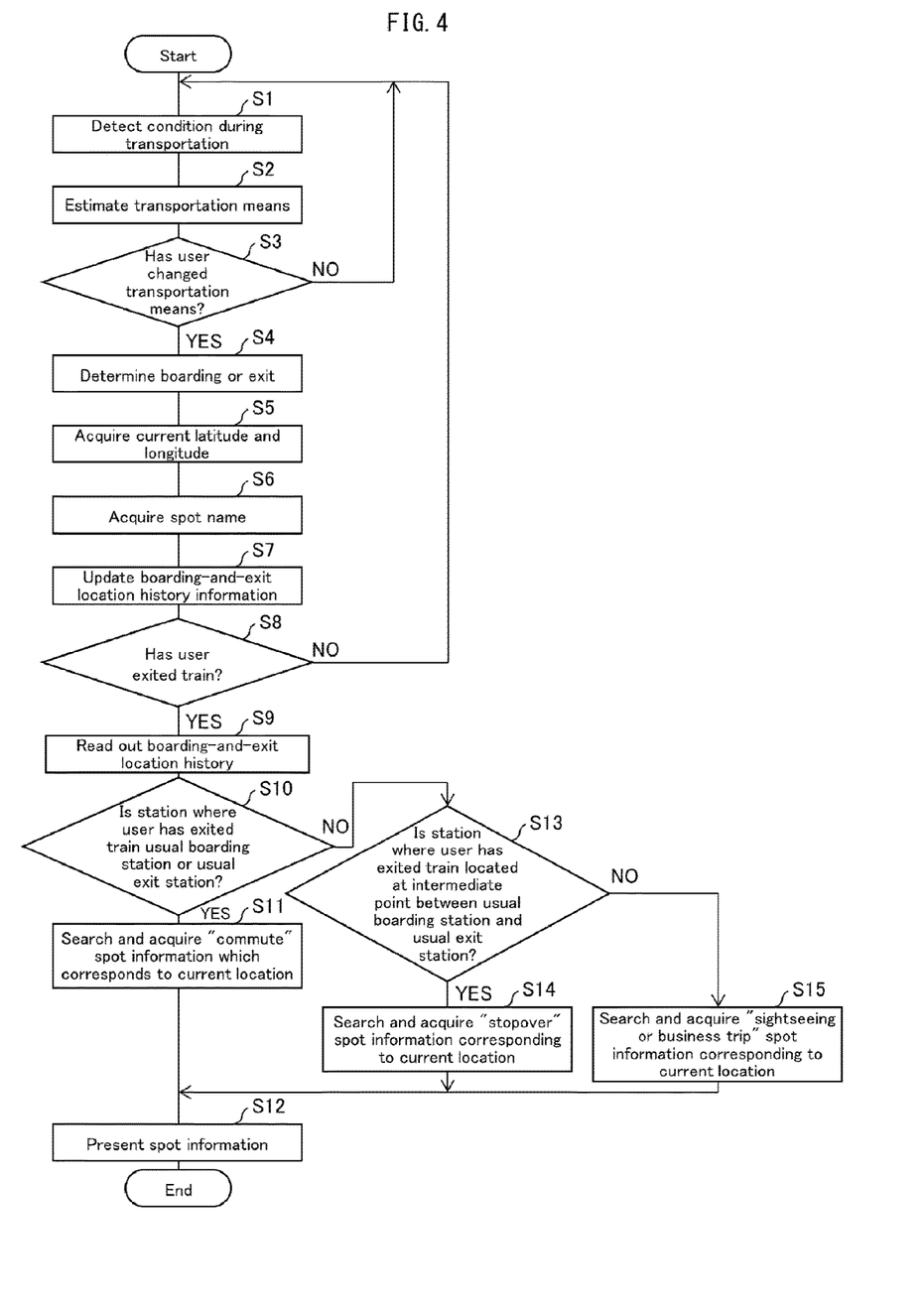
FIG. 4 is a flowchart illustrating a processing flow in the information processing device in accordance with Embodiment 1.

The following description will discuss a processing flow in the information processing device 1 in accordance with Embodiment 1. FIG. 4 is a flowchart illustrating the processing flow in the information processing device 1.

As illustrated in FIG. 4, the acceleration sensor 2 measures accelerations (condition during transportation) (S1), and then transmits the accelerations thus measured to the transportation means estimating section 41. The transportation means estimating section 41 estimates a transportation means based on the accelerations thus received (S2: transportation means estimating step), and then transmits, to the boarding-and-exit determining section 42, information indicative of the transportation means thus estimated. The boarding-and-exit determining section 42 determines whether the user has changed the transportation means (S3: change determining step). In a case where the boarding-and-exit determining section 42 determines that the user has changed the transportation means (i.e., YES in S3), it determines that an action of the user is "boarding" or "exit" (S4).

Subsequently, the boarding-and-exit determining section 42 acquires, via the location information acquiring section 43, current location information indicative of the longitude and latitude of a current location of the user (S5: location information acquiring step), and then transmits the current location information and the action of the user to the history update section 44. Upon receipt of the current location information, the history update section 44 acquires the name of a spot which corresponds to the current location information (S6), and then updates the boarding-and-exit location history information 64 (S7). After the step S4, the boarding-and-exit determining section 42 determines whether the user has exited the transportation means (train) (S8: exit determining step). In a case where the boarding-and-exit determining section 42 determines that the user has exited the transportation means (i.e., YES in S8), it transmits the current location information to the exit location determining section 45. Upon receipt of the current location information, the exit location determining section 45 reads out the boarding-and-exit location history information 64 (S9), and then determines whether the current location (exit station) is a usual boarding station or a usual exit station (S10). In a case where the exit location determining section 45 determines that the current location is the usual boarding station or the usual exit station (i.e., YES in S10), it (i) transmits the current location information to the spot information acquiring section 46 and (ii) instructs the spot information acquiring section 46 to search and acquire spot information which belongs to a category of "commute". The spot information acquiring section 46 acquires spot information which corresponds to (i) the current location information received from the exit location determining section 45 and (ii) the category of spot information acquired in response to the instruction of the exit location determining section 45. Note that the spot information acquiring section 46 can alternatively estimate a destination of the user based on the boarding-and-exit location history information 64 or the like so as to acquire, for example, arrival time to the destination (S11: spot information acquiring step). The spot information acquiring section 46 transmits the spot information thus acquired to the spot information presenting section 47. The spot information presenting section 47 causes the display section 7 or the voice output section 8 to output the spot information via the voice control section 48 or the display control section 49, respectively. The spot information is thus presented to the user (S12: spot information presenting step).

Meanwhile, in a case where the exit location determining section 45 determines that the current location indicated by the current location information is not the usual boarding station or the usual exit station (i.e., NO in S10), it determines whether the current location matches a location indicative of an intermediate location between the usual boarding station and the usual exit station (S13). In a case where the exit location determining section 45 determines that the current location matches the location indicative of the intermediate location (i.e., YES in S13), it (i) transmits the current location information to the spot information acquiring section 46 and (ii) instructs the spot information acquiring section 46 to search and acquire spot information which belongs to a category of "stopover". The spot information acquiring section 46 acquires spot information which corresponds to (i) the current location information received from the exit location determining section 45 and (ii) the category of spot information acquired in response to the instruction of the exit location determining section 45 (S14: spot information acquiring step). After that, the step S12 is proceeded with.

In a case where the exit location determining section 45 determines that the current location indicated by the current location information does not match the intermediate location between the usual boarding station and the usual exit station (i.e., NO in S13), it (i) transmits the current location information to the spot information acquiring section 46 and (ii) instructs the spot information acquiring section 46 to search and acquire spot information which belongs to a category of "sightseeing or business trip". The spot information acquiring section 46 acquires spot information which corresponds to (i) the current location information received from the exit location determining section 45 and (ii) the category of spot information acquired in response to the instruction of the exit location determining section 45 (S15: spot information acquiring step). After that, the step S12 is proceeded with.

In a case where (i) the boarding-and-exit determining section 42 determines that the user has not changed the transportation means (i.e., NO in S3) or (ii) the boarding-and-exit determining section 42 determines that the user has not exited the transportation means (i.e., NO in S8), the step 51 is proceeded with.

Note that Embodiment 1 has discussed an example configuration in which the user's boarding and exiting are determined in terms of the train. However, the transportation means which the user boards or exits is not particularly limited to the train. Alternatively, the transportation means can be a public transportation, different from trains, such as a bus, a car owned by the user, a bicycle owned by the user, or the like.

[Embodiment 2]

Figure 5:
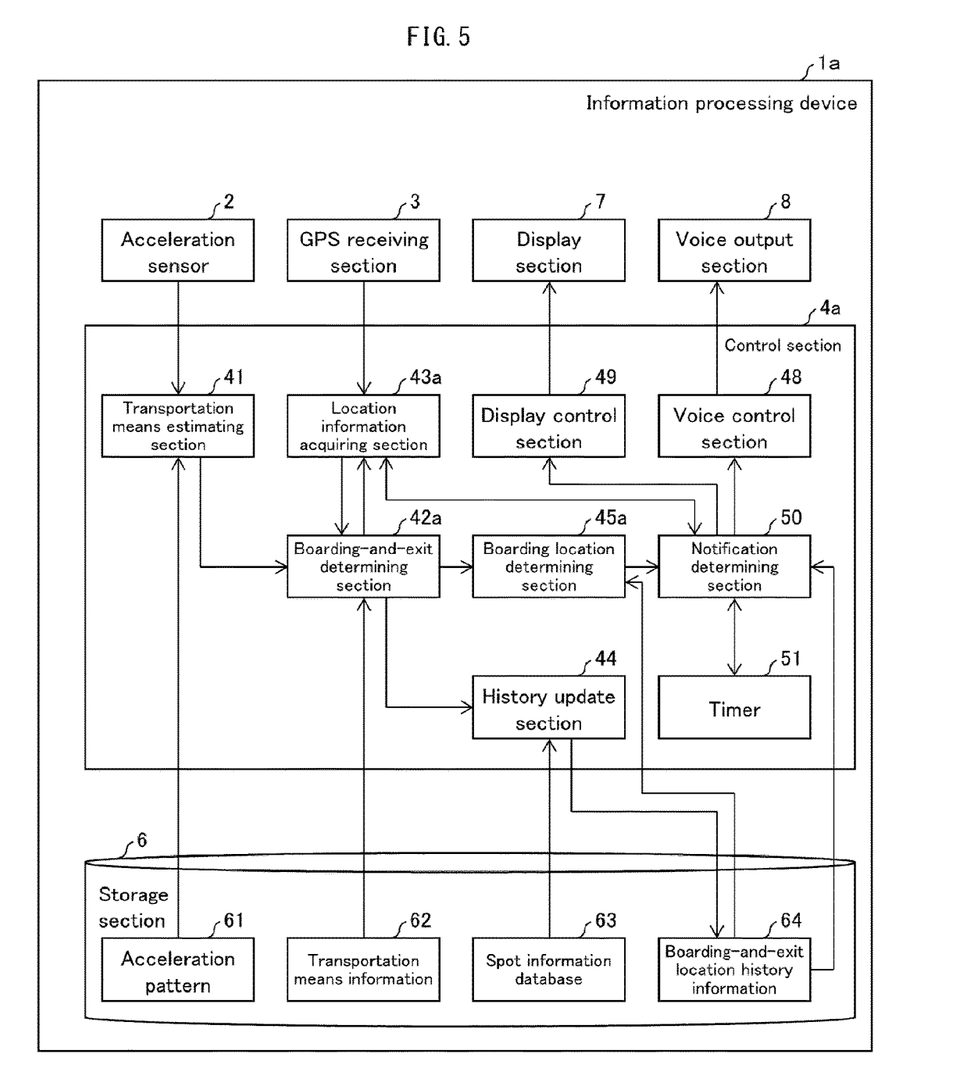
FIG. 5 is a block diagram illustrating a configuration of a main part of an information processing device in accordance with Embodiment 2.
Figure 6:
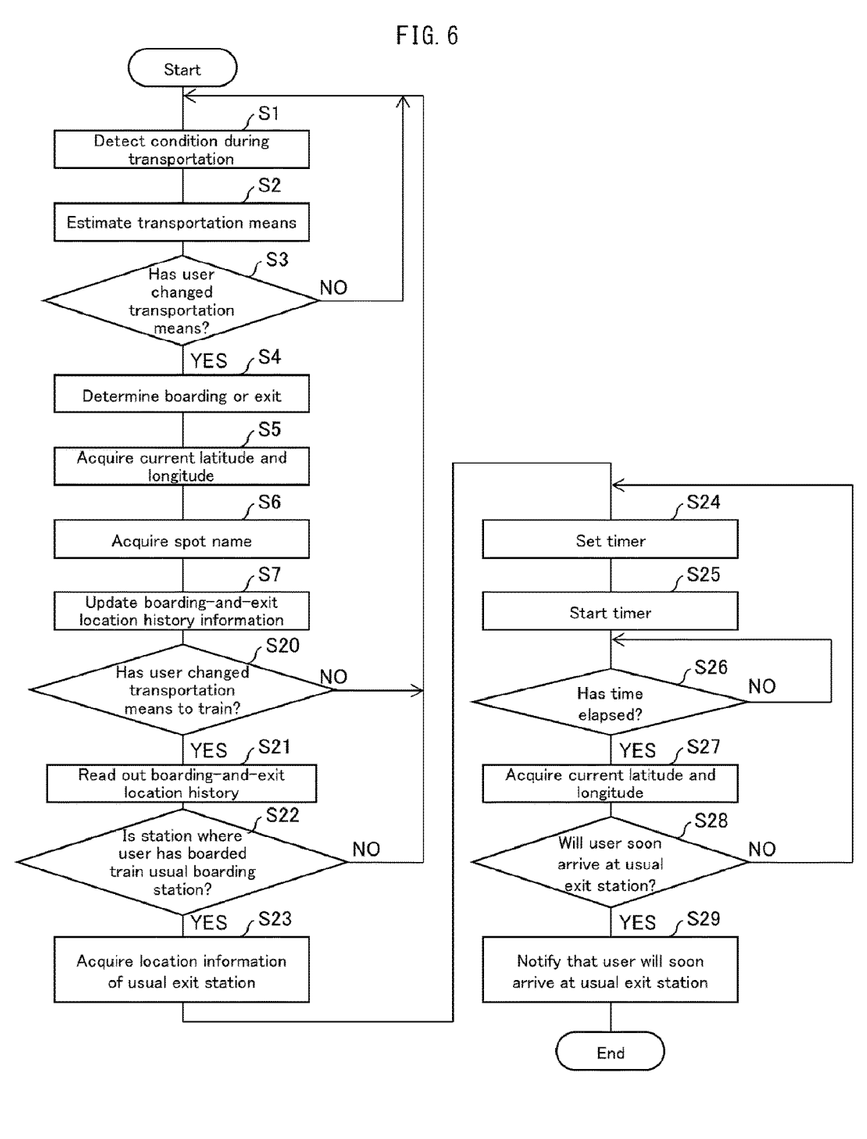
FIG. 6 is a flowchart illustrating a processing flow in the information processing device in accordance with Embodiment 2.

The following description will discuss Embodiment 2 of the present invention with reference to FIGS. 5 and 6. Note that for convenience, members having functions identical to those discussed in Embodiment 1 are given the same reference numerals, and descriptions of such members are omitted.

A configuration of a main part of an information processing device 1a in accordance with Embodiment 2 will be discussed below with reference to FIG. 5. FIG. 5 is a block diagram illustrating the configuration of the main part of the information processing device 1a. As illustrated in FIG. 5, the information processing device 1a includes a control section 4a, instead of the control section 4 of the information processing device 1 in accordance with Embodiment 1.

The control section 4a includes a transportation means estimating section 41, a boarding-and-exit determining section 42a, a location information acquiring section 43a, a history update section 44, a boarding location determining section 45a, a notification determining section 50, a timer 51, a voice control section 48, and a display control section 49.

The transportation means estimating section 41, the history update section 44, the voice control section 48, and the display control section 49 have been discussed in detail in Embodiment 1, and descriptions of those members are therefore omitted.

The boarding-and-exit determining section 42a determines whether a user has changed the transportation means. In a case where the boarding-and-exit determining section 42a determines that the user has changed the transportation means, it further determines whether the user has boarded another transportation means. The boarding-and-exit determining section 42a carries out processes regarding "boarding" in a manner similar to the boarding-and-exit determining section 42 of Embodiment 1. In a case where the boarding-and-exit determining section 42 determines that an action of the user is boarding, it transmits current location information to the boarding location determining section 45a.

In accordance with instructions from respective of the boarding-and-exit determining section 42a and the notification determining section 50, the location information acquiring section 43a receives a GPS signal via a GPS receiving section 3 so as to acquire the current location information indicative of a current location of the user.

The boarding location determining section 45a determines whether a current location, indicated by current location information received from the boarding-and-exit determining section 42a, matches a usual boarding station. The determination made by the boarding location determining section 45a is similar to that made by the exit location determining section 45 of Embodiment 1 as to "whether the current location information matches previous location information which appeared relatively frequently in the boarding-and-exit location history information 64MN", and descriptions thereof are therefore omitted.

In a case where the current location of the user matches the usual boarding station, the boarding location determining section 45a acquires, from boarding-and-exit location history information 64, location information indicative of a location of a usual exit station, and then transmits the location information thus acquired to the notification determining section 50.

Upon receipt of the location information indicative of the location of the usual exit station, the notification determining section 50 (i) sets the timer 51 for given time, (ii) causes the timer 51 to start, and then (iii) monitors whether the given time has elapsed. At the time when the given time having elapsed is ensured, the notification determining section 50 acquires, via the location information acquiring section 43a, location information indicative of a current location of the user. The notification determining section 50 calculates a distance between the location of the usual exit station and the current location so as to determine whether the distance between the two locations is shorter than a given distance, and then determines whether the user will soon arrive at the usual exit station.

A voice output section 8 of Embodiment 2 includes at least earphones as a voice output device.

With the above configuration, in a case where the user uses transportation means such as a train or a bus to commute, the user can be prevented from missing the usual exit station without (i) conducting any extra setting operation in advance and/or (ii) monitoring a display of, for example, a navigation function at all time.

A processing flow in the information processing device 1a in accordance with Embodiment 2 will be discussed below. FIG. 6 is a flowchart illustrating the processing flow in the information processing device 1a.

Steps from 51 through S7 are identical to those of the processing flow in the information processing device 1 in accordance with Embodiment 1, and descriptions of the steps are therefore omitted. After the step S4, the boarding-and-exit determining section 42a determines whether a user has boarded the transportation means (train) (whether the user has changed the transportation means to a train) (S20). In a case where the boarding-and-exit determining section 42a determines that the user has boarded the transportation means (i.e., YES in S20), it transmits current location information to the boarding location determining section 45a. Upon receipt of the current location information, the boarding location determining section 45a reads out the boarding-and-exit location history information 64 (S21), and then determines whether a location indicated by the current location information matches a usual boarding station (S22). In a case where the boarding location determining section 45a determines that the location indicated by the current location information matches the usual boarding station (i.e., YES in S22), it acquires, from the boarding-and-exit location history information 64, location information indicative of a location of a usual exit station (S23), and then transmits, to the notification determining section 50, the location information indicative of the location of the usual exit station. Upon receipt of the location information indicative of the location of the usual exit station, the notification determining section 50 sets the timer 51 for given time (S24), starts the timer 51 (S25), and monitors whether the given time has elapsed (S26). At the time when the given time having elapsed is ensured (i.e., YES in S26), the notification determining section 50 acquires, via the location information acquiring section 43a, location information (latitude and longitude) indicative of a current location of the user (S27). Subsequently, the notification determining section 50 determines whether the user will soon arrive at the usual exit station (S28). In a case where the notification determining section 50 determines that the user will soon arrive at the usual exit station (i.e., YES in S28), (i) it causes, via the voice control section 48, the voice output section 8 to output a voice saying that the user will soon arrive at the usual exit station or (ii) it causes, via the display control section 49, a display section 7 to display that the user will soon arrive at the usual exit station (S29).

In a case where (i) the boarding-and-exit determining section 42a determines that the user has not boarded his/her transportation means (NO in S20) or (ii) the boarding location determining section 45a determines that the location, indicated by the current location information received from the boarding-and-exit determining section 42a, does not match the usual boarding station (i.e., NO in S22), the step S1 is proceeded with. In a case where the notification determining section 50 determines that the user will not soon arrive at the usual exit station (i.e., NO in S28), the process returns to the step S24.

[Embodiment 3]

Each of the control sections 4 and 4a of the respective information processing devices 1 and 1a can be realized by a logic circuit (hardware) provided in an integrated circuit (IC chip) or the like or can be alternatively realized by software as executed by a central processing unit (CPU). In the latter case, the information processing device 1 or 1a includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Main Points]

An information processing device (1) in accordance with a first aspect of the present invention includes: a transportation means estimating section (41) configured to estimate a transportation means which a user uses during transportation; a change determining section (boarding-and-exit determining section 42) configured to determine whether the user has changed the transportation means; an exit determining section (42) configured to determine that the user has exited the transportation means, in a case where the change determining section determines that the user has changed the transportation means; a location information acquiring section (43) configured to acquire current location information indicative of a current location of the user; a spot information acquiring section (46) configured to acquire spot information which corresponds to current location information which was acquired when the exit determining section determined that the user had exited the transportation means; and a spot information presenting section (47) configured to present the spot information to the user.

With the above configuration, the information processing device can (i) acquire spot information which corresponds to a location where the user has exited the transportation means and (ii) presents the spot information to the user. This allows the user to easily obtain spot information which corresponds to a location where the user has exited a transportation means.

The information processing device in accordance with a second aspect of the present invention can be configured such that, in the first aspect of the present invention, the spot information acquiring section acquires spot information which corresponds to a relationship between (i) respective of a plurality of pieces of previous location information, stored in history data (boarding-and-exit location history information 64), each of which indicates a location where the user has ever boarded or exited the transportation means and (ii) the current location information.

The above configuration makes it possible to acquire spot information which corresponds to a relationship between (i) a location where the user has ever boarded or exited a transportation means and (ii) a location where the user has currently exited a transportation means.

It is therefore possible to change a type of the spot information, which is to be presented to the user, depending on a relationship between (i) a location where the user has ever boarded or exited a transportation means and (ii) a location where the user has currently exited a transportation means.

The information processing device in accordance with a third aspect of the present invention can be configured such that, in the second aspect of the present invention, in a case where the current location information matches previous location information, out of the plurality of pieces of previous location information, which appeared relatively frequently in the history data, the spot information acquiring section acquires spot information which corresponds to the current location information matching the previous location information which appeared relatively frequently in the history data.

With the above configuration, in a case where the current location information matches the previous location information which appeared relatively frequently in the history data, it is possible to present, to the user, the spot information which corresponds the current location information matching the previous location information which appeared relatively frequently in the history data.

Examples of a location indicated by the previous location information which appeared relatively frequently in the history data include a station which the user uses to commute to and from work, school, or the like. In a case where the user has exited a transportation means at the station where the user uses to commute to and from work, school, or the like, it is possible to present, to the user, spot information which corresponds to the station which the user uses to commute to and from work, school, or the like. For example, it is possible to present spot information which supports actions which the user takes every day.

The information processing device in accordance with a fourth aspect of the present invention can be configured such that, in the second aspect of the present invention, in a case where the current location information matches location information indicative of an intermediate location between two locations which are indicated by respective two pieces of previous location information, out of the plurality of pieces of previous location information, which appeared relatively frequently in the history data, the spot information acquiring section acquires spot information which corresponds to the current location information matching the location information indicative of the intermediate location. With the above configuration, in a case where the current location information matches the location information indicative of the intermediate location between the two locations indicated by the respective two pieces of previous location information which appeared relatively frequently in the history data, it is possible to present, to the user, the spot information which corresponds to the current location information matching the location information indicative of the intermediate location.

Examples of the intermediate location include a station located between stations where the user boards or exits a train while commuting. In some cases, the user is assumed to make a stopover while commuting. With the above configuration, it is possible to present spot information which corresponds to a station which the user uses to make a stopover. In other words, in a case where the user is making a stopover, it is possible to present spot information which can support the stopover of the user.

The information processing device in accordance with a fifth aspect of the present invention can be configured such that, in the second aspect of the present invention, in a case where the current location information matches none of (i) two pieces of previous location information, out of the plurality of pieces of previous location information, which appeared relatively frequently in the history data and (ii) location information indicative of an intermediate location between two locations indicated by the respective two pieces of previous location information, the spot information acquiring section acquires spot information which corresponds to the current location information matching none of (i) the two pieces of previous location information and (ii) the location information indicative of the intermediate location.

With the above configuration, in a case where the current location information matches none of (i) the two pieces of previous location information which appeared relatively frequently in the history data and (ii) the location information indicative of the intermediate location between the two locations indicated by the respective two pieces of previous location information, it is possible to present, to the user, the spot information which corresponds to the current location information matching none of the two pieces of previous location information and the location information indicative of the intermediate location.

Examples of the current location include a station which the user uses to go on a sightseeing or a business trip. With the above configuration, it is possible to present spot information which corresponds to a station which the user uses to go on a sightseeing or a business trip.

That is, in a case where the user exited a transportation means while going on a sightseeing or a business trip, it is possible to present spot information which can support the sightseeing or the business trip of the user.

A portable terminal in accordance with a sixth aspect of the present invention can include an information processing device in accordance with any one of the first through fifth aspects of the present invention.

The above configuration makes it possible to realize a portable terminal which allows a user to easily obtain spot information which corresponds to a location where the user has exited a transportation means.

A method of controlling an information processing device in accordance with a seventh aspect of the present invention includes the steps of: (a) estimating a transportation means which a user uses during transportation; (b) determining whether the user has changed the transportation means; (c) determining that the user has exited the transportation means, in a case where it is determined in the step (b) that the user has changed transportation means; (d) acquiring current location information indicative of a current location of the user; (e) acquiring spot information which corresponds to current location information which was acquired in the step (d) when it was determined in the step (c) that the user had exited the transportation means; and (f) presenting the spot information to the user.

The above configuration brings about an effect similar to that brought about by the first aspect of the present invention.

The information processing device in accordance with each aspect of the present invention can be realized by a computer. In this case, the scope of the present invention encompasses: a control program for causing a computer to operate as each section (software element) of the information processing device so that the information processing device can be realized by the computer; and a computer-readable recording medium in which the control program is recorded.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention is applicable to a portable telephone, a laptop computer, a tablet terminal, an e-book reader, a PDA, or the like.

REFERENCE SIGNS LIST

1: Information processing device
41: Transportation means estimating section
42: Exit determining section (change determining section)
43: Location information acquiring section
46: Spot information acquiring section
47: Spot information presenting section 64: Boarding-and-exit locations history information (history data)

The invention claimed is:

1. An information processing device, comprising:
a central processing unit (CPU) configured or programmed to:
estimate a mode of transportation which a user uses during transportation;
determine whether the user has changed the mode of transportation;
determine that the user has stopped using the mode of transportation, in a case where the CPU determines that the user has changed the mode of transportation;
acquire current location information indicative of a current location of the user;
acquire spot information which corresponds to the current location information which was acquired when the CPU determined that the user had stopped using the mode of transportation; and
present the spot information to the user, wherein
the CPU acquires the spot information which corresponds to a relationship between (i) respective ones of a plurality of pieces of previous location information, stored in history data, each of which indicates a location where the user has ever boarded or exited the mode of transportation, and (ii) determined current location information, which is the current location information acquired when the user had stopped using the mode of transportation; and
in a case where the determined current location information matches location information indicative of an intermediate location between two locations which are indicated by respective two pieces of previous location information, out of the plurality of previous location information, which appeared in the history data at a frequency higher than a threshold value, the CPU acquires the spot information which corresponds to the determined current location information matching the location information indicative of the intermediate location.

2. The information processing device as set forth in claim 1, wherein:
in a case where the determined current location information matches previous location information, out of the plurality of pieces of previous location information, which appeared in the history data at the frequency higher than the threshold value, the CPU acquires the spot information which corresponds to the determined current location information matching the previous location information which appeared in the history data at the frequency higher than the threshold value.

3. An information processing device, comprising:
a central processing unit (CPU) configured or programmed to:
estimate a mode of transportation which a user uses during transportation;
determine whether the user has changed the mode of transportation;
determine that the user has stopped using the mode of transportation, in a case where the CPU determines that the user has changed the mode of transportation;
acquire current location information indicative of a current location of the user;
acquire spot information which corresponds to the current location information which was acquired when the CPU determined that the user had stopped using the mode of transportation; and
present the spot information to the user, wherein
the CPU acquires the spot information which corresponds to a relationship between (i) respective ones of a plurality of pieces of previous location information, stored in history data, each of which indicates a location where the user has ever started or stopped using the mode of transportation and (ii) determined current location information, which is the current location information acquired when the user had stopped using the mode of transportation; and
in a case where the determined current location information matches none of (i) two pieces of previous location information, out of the plurality of pieces of previous locationinformation, which appeared in the history data at a frequency higher than a threshold value and (ii) location information indicative of an intermediate location between two locations indicated by the respective two pieces of previous location information, the CPU acquires the spot information which corresponds to the determined current location information matching none of (i) the two pieces of previous location information and (ii) the location information indicative of the intermediate location.

4. The information processing device as set forth in claim 3, wherein:
in a case where the determined current location information matches previous location information, out of the plurality of pieces of previous location information, which appeared in the history data at the frequency higher than the threshold value, the CPU acquires the spot information which corresponds to the determined current location information matching the previous location information which appeared in the history data at the frequency higher than the threshold value.

5. A portable terminal, comprising:
an information processing device recited in claim 1.

6. A method of controlling an information processing device, comprising the steps of:
(a) estimating a mode of transportation which a user uses during transportation;
(b) determining whether the user has changed the mode of transportation;
(c) determining that the user has stopped using the mode of transportation, in a case where it is determined in the step (b) that the user has changed the mode of transportation;
(d) acquiring current location information indicative of a current location of the user;
(e) acquiring spot information which corresponds to the current location information which was acquired in the step (d) when it was determined in the step (c) that the user had stopped using the mode of transportation; and
(f) presenting the spot information to the user, wherein
in the step (e), acquiring the spot information which corresponds to a relationship between (i) respective ones of a plurality of pieces of previous location information, stored in history data, each of which indicates a location where the user has ever started or stopped using the mode of transportation and (ii) determined current location information, which is the current location information acquired when the user had stopped using the mode of transportation, and
in the step (e), in a case where the determined current location information matches location information indicative of an intermediate location between two locations which are indicated by respective two pieces of previous location information, out of the plurality of pieces of previous location information, which appeared in the history data at a frequency higher than a threshold value, acquiring the spot information which corresponds to the determined current location information matching the location information indicative of the intermediate location.

7. A non-transitory computer-readable recording medium, in which a control program for causing a computer to function as an information processing device recited in claim 1 is recorded, the program causing the computer to function as the CPU of the information processing device.

8. A portable terminal, comprising:
an information processing device recited in claim 3.

9. A non-transitory computer-readable recording medium, in which a control program for causing a computer to function as an information processing device recited in claim 3 is recorded, the program causing the computer to function as the CPU of the information processing device.

10. A method of controlling an information processing device, comprising the steps of:
(a) estimating a mode of transportation which a user uses during transportation;
(b) determining whether the user has changed the mode of transportation;
(c) determining that the user has exited the mode of transportation, in a case where it is determined in the step (b) that the user has changed the mode of transportation;
(d) acquiring current location information indicative of a current location of the user;
(e) acquiring spot information which corresponds to the current location information which was acquired in the step (d) when it was determined in the step (c) that the user had stopped using the mode of transportation; and
(f) presenting the spot information to the user, wherein
in the step (e), acquiring the spot information which corresponds to a relationship between (i) respective ones of a plurality of pieces of previous location information, stored in history data, each of which indicates a location where the user has ever started or stopped using the mode of transportation and (ii) determined current location information, which is the current location information acquired when the user had stopped using the mode of transportation, and
in the step (e), in a case where the determined current location information matches none of (i) two pieces of previous location information, out of the plurality of pieces of previous location information, which appeared in the history data at a frequency higher than a threshold value and (ii) location information indicative of an intermediate location between two locations indicated by the respective two pieces of previous location information, acquiring the spot information which corresponds to the determined current location information matching none of (i) the two pieces of previous location information and (ii) the location information indicative of the intermediate location.

\* \* \* \* \*